United States Patent [19]

Kim et al.

[11] Patent Number: 5,099,513
[45] Date of Patent: Mar. 24, 1992

[54] INTEGRATED CIRCUIT FOR GENERATING A MELODY AND RING

[75] Inventors: Yong-Hoon Kim, Seoul; Kye-Eon Chang, Incheon, both of Rep. of Korea

[73] Assignee: Samsung Electronics Co. Ltd., Kwonson, Rep. of Korea

[21] Appl. No.: 484,423

[22] Filed: Feb. 23, 1990

[30] Foreign Application Priority Data

Apr. 26, 1989 [KR] Rep. of Korea ............... 89-5488

[51] Int. Cl.$^5$ ........................................ H04M 11/02
[52] U.S. Cl. ................................. 379/374; 379/373; 379/252
[58] Field of Search ............ 379/387, 373, 374, 375, 379/251, 252, 253

[56] References Cited

U.S. PATENT DOCUMENTS

| 4,480,153 | 10/1984 | Festa | 379/374 |
| 4,720,848 | 1/1988 | Akiyama | 379/374 X |
| 4,856,055 | 8/1989 | Schwartz | 379/387 X |
| 4,866,766 | 9/1989 | Mitzlaff | 379/374 |

FOREIGN PATENT DOCUMENTS

| 0203394 | 12/1986 | European Pat. Off. | 379/374 |
| 0225758 | 12/1983 | Japan | 379/374 |
| 0037859 | 2/1990 | Japan | 379/374 |

Primary Examiner—James L. Dwyer
Assistant Examiner—M. Shehata
Attorney, Agent, or Firm—Ladas & Parry

[57] ABSTRACT

An integrated circuit for generating a melody and ring comprises a starting voltage detector a frequency discriminator a controller a ring/melody data ROM an oscillator/frequency doubler a frequency divider a tempo/rhythm generator a chord generator an original-melody generator and an envelope output part. A ring circuit and melody circuit are formed together in one chip, thereby can reduce the prime cost of the telephone by generating selectively a ring signal in a ring mode or a melody signal in a melody mode.

1 Claim, 1 Drawing Sheet

INTEGRATED CIRCUIT FOR GENERATING A MELODY AND RING

BACKGROUND OF THE INVENTION

The present invention relates to a telephone, particularly to an integrated circuit for generating a melody and ring which can provide selectively a ring signal or a chord melody signal by forming both melody and ring circuits in one chip.

Generally, the telephone uses the ring circuit to generate the ring signal notifying an arrival of transmitting signal and the chord melody circuit to send the chord melody signal to a counterpart under the necessity in the middle of a call. But, the ring circuit includes bipolar transistors, while the chord melody circuit includes MOS(metal oxide semiconductor) transistors so that two IC's are used to provide both ring and melody signals, thereby rising the prime cost of the telephones.

SUMMARY OF THE INVENTION

It is an object of the present invention to provide an integrated circuit for a ring and melody which can reduce the prime cost of the telephone by generating selectively a ring signal in a ring mode or a melody signal in a melody mode since a ring circuit includes MOS transistors so both ring circuit and melody circuit are formed together in one chip.

An invention resides in an integrated circuit for generating a melody and ring comprises a starting voltage detector to provide an enable signal to a frequency discriminator of next stage when an applied supply voltage level gets to a specified level; a frequency discriminator to generate a ring enable signal by comparing a ring input signal with an output frequency of a frequency divider at the next stage to check whether the ring input signal is in the range of a specified frequency band or not; a controller to provide a control signal according to the ring enable signal, a signal of a ring/melody data ROM(read only memory)part; and the ring/melody signal; a ring/melody data ROM part to send out the memorized data by the control signal of the controller; an oscillator/frequency doubler operating by the control signal of the controller; a frequency divider to divide the doubled frequency of the oscillator/frequency doubler according to the control signal of the controller; a tempo-rhythm part to generate a tempo and rhythm according to the output data of the ring/melody data ROM part and the divided signal of the frequency divider and apply the control signal to the controller; a chord generator to generate a chord signal according to the outputs of the frequency doubler and the ring/melody data ROM part, an original-melody generator to produce a melody according to the output of the oscillator/frequency doubler and the output data of the ring/melody data ROM part; and an envelope output part to provide the melody signal of the original melody generator and the chord signal of the chord generator as the chord-melody signal or ring signal according to the signal of the ring/melody data ROM part acting by the control signal of the controller.

These and other objects, features, and advantages of the present invention will become more apparent from the following description for the preferred embodiments taken in conjunction with the accompanying drawings.

DETAILED DESCRIPTION OF THE PREFERRED EMBODIMENTS

Figure 1:
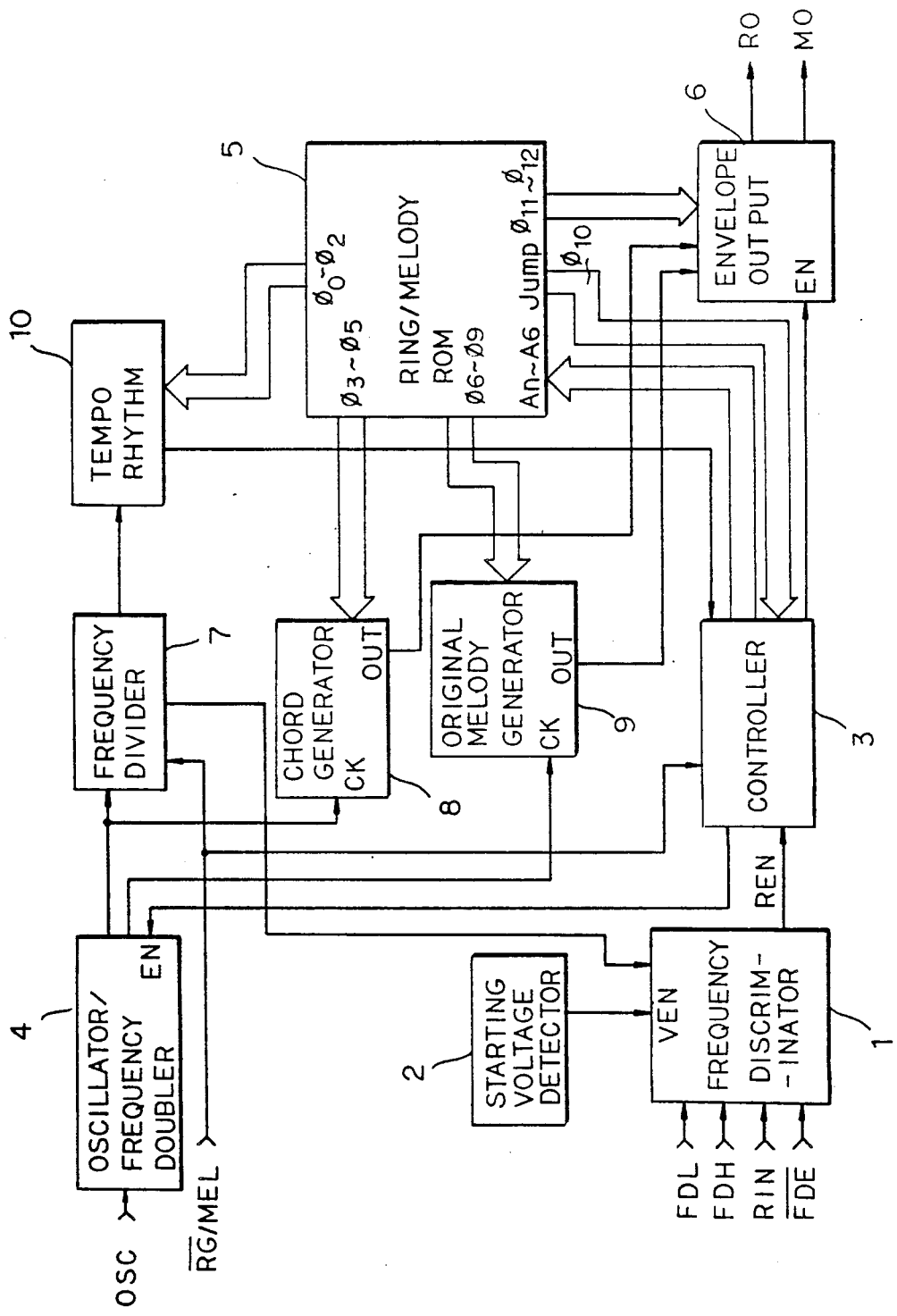
FIG. 1 is a block diagram of an integrated circuit for generating a melody tone according to the present invention.

The present invention will be now described in more detail with reference to the accompanying drawings.

FIG. 1 is a block diagram of a melody tone generation circuit. If an input signal is a specified voltage level for starting the operation, then a starting voltage detector 2 is connected to a frequency discriminator 1 to provide an enable signal. The frequency discriminator 1 provides a ring enable signal REN to a controller 3 by an enable signal VEN of the starting voltage detector 2 when a frequency enable signal $\overline{FDE}$ is high and a ring input signal RIN is also high. The controller 3 operates according to a ring/melody control signal RG/MEL and controls the oscillator/frequency doubler 4, the ring/melody data ROM 5, and to envelope output part 6.

Also, the above controller 3 provides an enable signal to oscillator/frequency doubler 4 when the ring enable signal REN or ring/melody control signal $\overline{RG/MEL}$ is applied. An oscillator/frequency doubler 4 operating according to the control signal of the controller 3 provides an oscillated frequency to a frequency divider 7 a chord generator 8 and a doubled frequency to an original-melody generator 9. The frequency divider 7 provides the frequency corresponding to the ring mode in the case of ring mode, while in the case of melody mode the melody frequency corresponding to the melody mode is provided.

On the other hand, a tempo-rhythm part 10 which uses the frequency signal of the frequency divider as a clock signal includes a tempo-counter, a rhythm-counter, and other circuits. The tempo-rhythm part 10 determines the tempo and the rhythm according to the data $\phi 0 - \phi 2$ provided from the ring/melody data ROM part 5 and provides the rhythm signal to the controller 3. The chord generator 8 including 7-bit counter receives the chord-decision data $\phi 3 - \phi 5$ from the data ROM part 5 to generate the chord frequency and apply it to the next envelope output part 6. Also, the original-melody generator 9 including a 8-bit counter receives the melody-decision data $\phi 6 - \phi 9$ from the ring/melody data ROM part 5 to generate the melody and apply it to the envelope output part 6. The envelope output part 6 connected to the chord generator and original-melody generator is driven by the output signal of the controller 3 and is also controlled by the melody control signals $\phi 11 - \phi 12$ provided from the ring/melody data ROM part 5. The symbols FDL and FDH in FIG. 1 represent the lower and upper limit of frequencies of the ring input signal RIN, respectively.

This ring operates in the ring mode the mode selection is made by controlling the ring/melody signal $\overline{RG/MEL}$ according to on-off operations of buttons attached on the telephone. The ring/melody signal $\overline{RG/MEL}$ becomes low for the ring mode, while it is high for the melody mode.

To find the ring mode generating the ring signal, first, the ring/melody control signal $\overline{RG/MEL}$ becomes the low level state. Thus, the controller 3 operates in the ring mode to enable the oscillator/frequency doubler 4 and the output of the oscillator/frequency doubler 4 is applied to the frequency divider 7.

Next, the divided output signal according to the ring mode at the frequency divider is applied to the tempo-rhythm part 10. On the other hand, when the supply voltage becomes the starting voltage level by the input ring signal, the starting voltage detector 2 provides the enable signal to the frequency discriminator 1, that is, the frequency discriminator 1 operates by receiving the ring input signal RIN with high level.

At this time, the frequency discriminator 1 compares the frequency of the ring input signal with the output frequency of the frequency divider 7 to check whether the ring signal is in the specified frequency range FDH-FHL or not when the control signal $\overline{FDE}$ is in the low level state. If it is in the specified frequency range FDH-FHL, then the frequency discriminator 1 provides the ring enable signal REN. On the other hand, if the control signal $\overline{FED}$ is in the high level state, the frequency discriminator 1 provides the ring enable signal REN irrelevantly to the frequency range of the ring input signal RIN. The controller 3 provides the enable signal according to the ring mode to the envelope output part 6 and provides the ring mode address signals A0-A6 to the ring/melody data ROM part 5.

Next, the ring/melody data ROM part 5 provides a 3-bit tempo and rhythm-decision data $\phi 0$-$\phi 2$ to the tempo-rhythm part 10 according to the address signals A0-A6 and also provides a 4-bit data $\phi 6$-$\phi 9$ to the original melody generator 9. The tempo-rhythm part 10 uses the output signal of the frequency divider 7 as the clock signal of internal tempo-counter and rhythm-counter. On the other hand, the tempo is determined by one bit of the 3-bit tempo and rhythm-decision data $\phi 0$-$\phi 2$, while 2 bits of the remainder control the reset of the rhythm counter to make one of the rhythms , , , for composing the melody.

Next, the controller 3 provides the address signals A0-A6 corresponding to the next melody to the ring-/melody data ROM part 5. Similarly, the ring/melody data ROM part 5 provides the next tempo and rhythm-decision data $\phi 0$-$\phi 2$ and the melody-decision data $\phi 6$-$\phi 9$ according to the address signal. When the ring-/melody data ROM part 5 provides all of the memorized melody data or needs to repeat data, the data ROM part 5 provides a jump signal JUMP to the controller 3 and the controller 3 gives again the specified address signals A0-A6 to the data ROM part 5. Thus, ring/melody data ROM part 5 can provides all data from the start address or repeats the data. Also, the original melody generator 9 which receives the melody-decision data $\phi 6$-$\phi 9$ from the ring/melody data ROM part 5 controls the set or reset of the 8-bit programmable counter using the 4-to-12 decoded data to generate the melody frequency and provide it to the next envelope output part 6.

Second, the melody mode for the generation of the melody signal will be now described. If the ring-/melody control signal $\overline{RG/MEL}$ is applied to the circuit as the high level, the controller 3 operates in the melody mode according to the control signal $\overline{RG/MEL}$. Thus, the controller 3 enables the oscillator/frequency multiplier 4 to provide the oscillated frequency to the frequency divider 7 and the doubled frequency to the original-melody generator 9. The frequency divider 7 provides the output to the tempo-rhythm part 10 after dividing the oscillated frequency according to the control signal $\overline{RG/MEL}$ of high level.

At this time, the controller 3 provides to enable signal for the melody mode to the envelope output part 6 and also provides the address signals A0-A6 according to the melody mode to the ring/melody data ROM part 5. Thus, the ring/melody data ROM PART 5, the tempo-rhythm part 10, and the original-melody generator 9 operate same as described before in the ring mode. But, the melody mode needs the chord for the melody differently with the ring mode, so the ring/melody data ROM part 5 provides the chord-decision data $\phi 3$-$\phi 5$ to the chord generator 8.

The chord generator 8 controls the 7-bit programmable counter which uses the oscillated frequency of the oscillator/frequency multiplier as the clock after the 3-to-8 decoding of the 3-bit data $\phi 3$-$\phi 5$ to generate the chord frequency and provide it to the envelope output part 6. The envelope output part 6 operating by the enable signal of the controller 3 for the ring and melody modes determines the melody signal emphasis, the chord signal emphasis, the common of the chord and melody signals, or the output of the chord and melody signals provided from the chord and melody generators 8 and 9 by using the control signals $\phi 11$-$\phi 12$ of the ring/melody data ROM part 5. Thus, the envelope output part 6 provides the determined ring signal through the ring output terminal RO in the ring mode, while provides the determined melody signal through the melody output terminal MO in the melody mode.

As mentioned up to now, the present invention, an integrated circuit for generating a melody and ring, can reduce the prime cost of the telephone by forming both ring and melody circuits in one chip, which provides the ring signal using the memorized data of the ring-/melody data ROM part according to the applied ring input signal when the voltage signal of the specified range is applied in the ring mode, and provides similarly the melody signal in the melody mode.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An integrated circuit for generating output melody and ring signals in a telephone set, comprising:
    an input ring signal detector for outputting an enable signal when the voltage of an input ring signal is more than a preselected threshold voltage;
    a frequency discriminator for comparing the frequency of the input ring signal with a preselected frequency range and outputting a ring-enable signal when the frequency of the arriving ring signal is within said preselected frequency range;
    a controller responsive alternatively to said ring-enable signal or to a melody enable signal under the selection of a user of the telephone set for controlling the operation of the circuit in either a ring output signal or melody output signal generating mode of operation,
    oscillating signal generating means for providing oscillating signals at pre-selected frequencies under the control of said controller and in accordance with the selected mode of operation of said circuit, selected ones of said oscillating signals being coupled to said frequency discriminator for use therein in said input ring signal comparison process;

a memory containing stored data, at preselected addresses in said memory, for controlling the tempo/rhythm, the melody, and the chord selection for said ring and melody output signals, said controller outputting addresses of the stored data corresponding to the selected mode of operation of the circuit;

a chord generator responsive to a selected oscillating signal from said signal generating means and cord determining data from said memory for generating a chord frequency for use in the generation of melody signals in an output signal generating circuit, an original melody generator responsive to a selected oscillating signal from said signal generating means and melody determining data from said memory for generating the melody frequency for use in the generation of both melody and ring output signals in said output signal generating circuit; and a tempo/rhythm circuit responsive to a selected oscillating signal from said signal generating means and tempo/rhythm determining data from said memory for outputting a rhythm signal for connection to said controller.

* * * * *